United States Patent
Hirano et al.

(10) Patent No.: US 11,407,291 B1
(45) Date of Patent: Aug. 9, 2022

(54) DOOR STRUCTURE

(71) Applicant: HONDA MOTOR CO., LTD., Tokyo (JP)

(72) Inventors: Eiji Hirano, Wako (JP); Takayuki Soma, Wako (JP); Masahiro Tanigawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/197,811

(22) Filed: Mar. 10, 2021

(51) Int. Cl.
*B60J 5/04* (2006.01)

(52) U.S. Cl.
CPC .......... *B60J 5/0426* (2013.01); *B60J 5/0413* (2013.01); *B60J 5/0415* (2013.01)

(58) Field of Classification Search
CPC ....... B60J 5/0426; B60J 5/0413; B60J 5/0415
USPC ...................................................... 296/146.6
See application file for complete search history.

(56) References Cited

U.S. PATENT DOCUMENTS

| | | | |
|---|---|---|---|
| 5,536,060 A * | 7/1996 | Rashid | B60J 5/045 49/502 |
| 7,530,624 B2 * | 5/2009 | Endo | B60J 5/0427 296/146.6 |
| 8,398,149 B2 * | 3/2013 | Weiter | B60J 5/0412 296/146.6 |
| 2007/0039245 A1 | 2/2007 | Buchta et al. | |
| 2007/0108794 A1 * | 5/2007 | Yagi | B60J 5/0426 296/187.11 |

FOREIGN PATENT DOCUMENTS

JP         2007-508186 A        4/2007

* cited by examiner

*Primary Examiner* — Joseph D. Pape
(74) *Attorney, Agent, or Firm* — Rankin, Hill & Clark LLP

(57) ABSTRACT

A door structure includes an outer panel and an inner panel. A panel outer member of the inner panel includes a front longitudinal side portion extending in an upper-lower direction at a front end portion of the panel outer member, a rear longitudinal side portion extending in the upper-lower direction at a rear end portion of the panel outer member, a lower side portion that joins a lower end portion of the front longitudinal side portion to a lower end portion of the rear longitudinal side portion, connecting members that connect the front longitudinal side portion to the rear longitudinal side portion in a front-rear direction, and reinforcement members provided separately from the connecting members and joined to the connecting members in such a way as to extend in the front-rear direction along the connecting members and to form closed cross-sections in spaces with the connecting members.

5 Claims, 4 Drawing Sheets

DOOR STRUCTURE

BACKGROUND OF THE INVENTION

1. Field of the Invention

The present invention relates to a door structure.

2. Description of the Related Art

A configuration to arrange a reinforcement member in the form of a panel between a substantially flat metal panel located on an outer side of a vehicle interior and a substantially U-shaped metal panel located on an inner side of the vehicle interior has heretofore been known as a conventional door structure (see Patent Literature 1, for example).

According to this door structure, it is possible to reduce thicknesses of the respective inner and outer metal panels, thereby reducing a weight of a door.

PRIOR ART DOCUMENT(S)

[Patent Literature(s)]
Patent Literature 1: JP 2007-508186 A

SUMMARY OF THE INVENTION

However, since the reinforcement member is formed into the panel in the conventional door structure (see Patent Literature 1, for example), there is a risk of deformation of the reinforcement member itself due to an input load in case of a vehicle collision. Accordingly, the conventional door structure has a problem of an incapability of sufficiently enhancing strength of a door.

Given the situation, it is an object of the present invention to provide a door structure which is excellent in strength of a door as compared to the conventional structure while achieving weight reduction of the door at the same time.

To attain the object, a door structure according to an aspect of the present invention provides a door structure including an outer panel and an inner panel, in which the inner panel is formed from a panel inner member located on an inner side of a vehicle interior and a panel outer member located on an outer side of the vehicle interior. Moreover, the panel outer member includes a front longitudinal side portion extending in an upper-lower direction at a front end portion of the panel outer member, a rear longitudinal side portion extending in the upper-lower direction at a rear end portion of the panel outer member, a lower side portion configured to join a lower end portion of the front longitudinal side portion to a lower end portion of the rear longitudinal side portion, a connecting member configured to connect the front longitudinal side portion to the rear longitudinal side portion in a front-rear direction, and a reinforcement member provided separately from the connecting member and joined to the connecting member in such a way as to extend in the front-rear direction along the connecting member and to form a closed cross-section in a space with the connecting member.

According to the door structure of the present invention, it is possible to be excellent in strength of a door as compared to the conventional structure while achieving weight reduction of the door at the same time.

DETAILED DESCRIPTION OF THE EMBODIMENTS

Next, a door structure of a mode for carrying out the present invention (this embodiment) will be described in detail.

Figure 1:
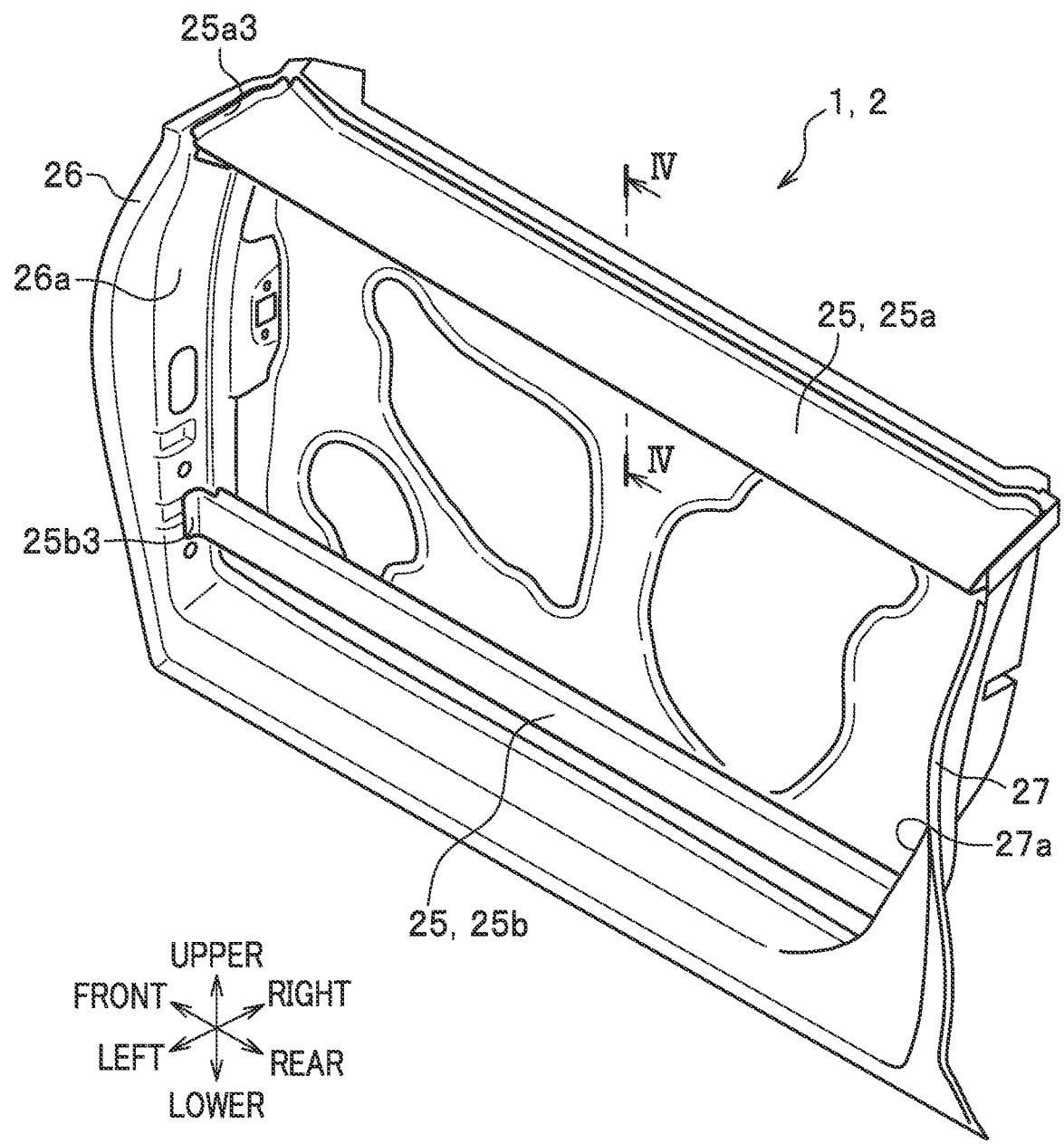
FIG. 1 is an perspective view of a vehicle door applying a door structure according to an embodiment of the present invention.
Figure 2:
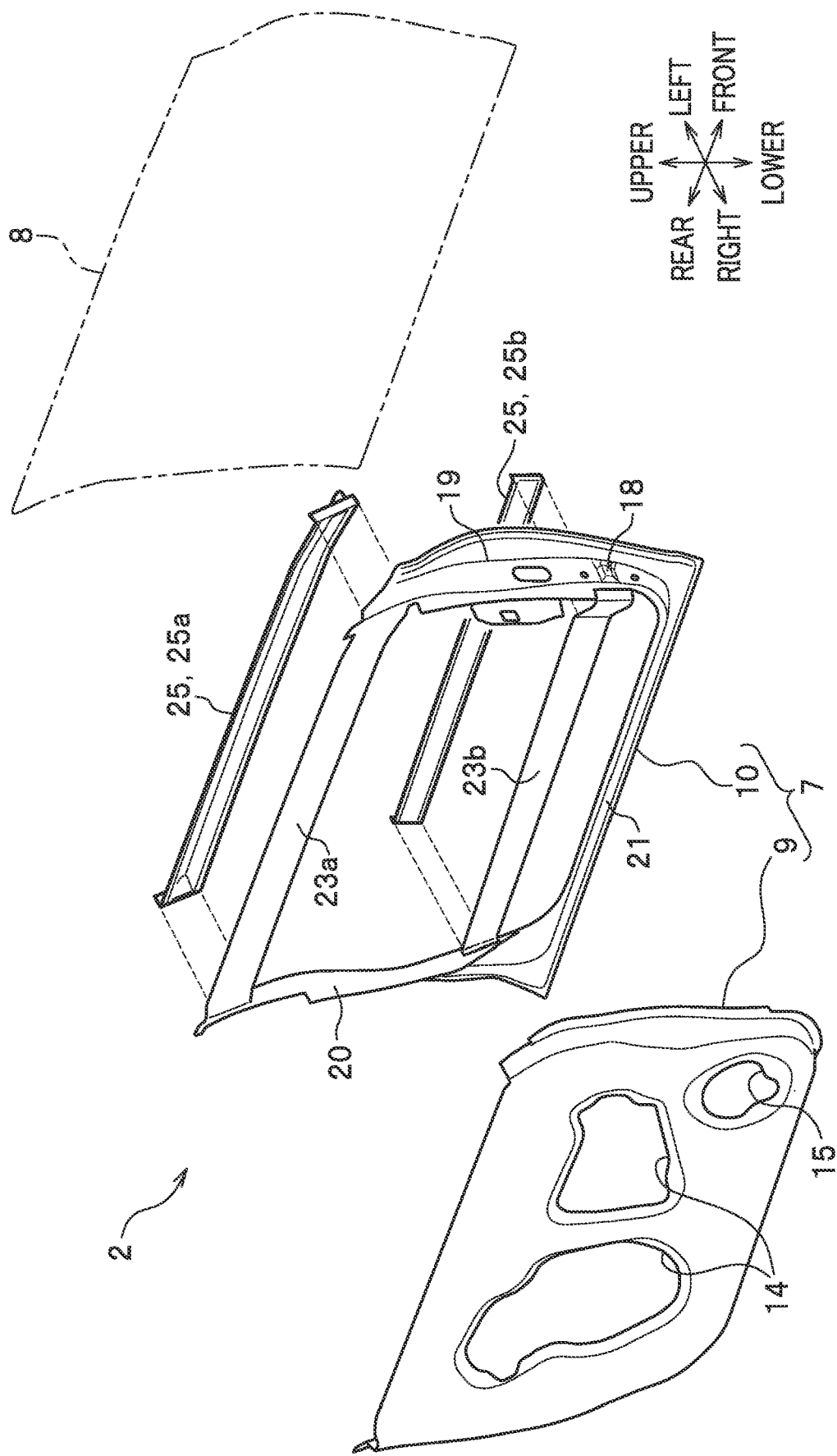
FIG. 2 is an exploded perspective view of the vehicle door applying the door structure according to the embodiment of the present invention.

FIG. 1 is a perspective view of a side door 2 on a left side of a vehicle applying a door structure 1 of this embodiment. FIG. 2 is an exploded perspective view of the side door 2 in FIG. 1. Note that the side door 2 shown in FIG. 1 is deprived of an outer panel 8 (see FIG. 2) for the convenience of illustration. Moreover, in FIG. 2, the outer panel 8 is indicated with phantom lines (chain double-dashed lines).

Front, rear, upper, lower, right, and left directions in this embodiment coincide with front, rear, upper, lower, right, and left directions of the vehicle.

In the following, a description will be given only of the door structure 1 applied to the side door 2 on the left side of the vehicle while omitting a description of a door structure 1 to be applied to a side door 2 on the right side of the vehicle which has a structure symmetric to the aforementioned structure with respect to a center axis of the vehicle.

Although illustration is omitted, the side door 2 shown in 1 which applies the door structure 1 of this embodiment is attached to a vehicle body side by using a hinge so as to open and close an opening on a side part of the vehicle.

As shown in FIG. 2, the side door 2 includes an inner panel 7 and the outer panel 8 that is also referred to as a door skin to be located on an outer side in a vehicle width direction (the left side of FIG. 2) of this inner panel 7. Incidentally, the outer panel 8 of this embodiment is assumed to be located at a given space from the inner panel 7. Thus, a hollow portion is formed between the outer panel 8 and the inner panel 7.

As shown in FIG. 2, the inner panel 7 is formed from two separate members, namely, a panel inner member 9 located on an inner side of the vehicle interior (the right side of FIG. 2) and a panel outer member 10 located on an outer side of the vehicle interior (the left side of FIG. 2).

The panel inner member 9 is formed to have narrower widths in a front-rear direction and an upper-lower direction as compared to relevant widths of the panel outer member 10 in lateral view of the side door 2.

The above-described panel inner member 9 is provided with two work holes 14 that allow access to a door hollow portion, and a speaker attachment hole 15.

Note that the panel inner member 9 of this embodiment can be obtained by subjecting a steel plate to ordinary press forming.

The panel outer member 10 includes a front longitudinal side portion 19 which extends in an upper-lower direction (an up-down direction) on a front side of the side door 2 and to which a hinge (not shown) is attached, a rear longitudinal side portion 20 which extends in the upper-lower direction (the up-down direction) on a rear side of the side door 2 in parallel to the front longitudinal side portion 19, and a lower side portion 21 which extends in the front-rear direction in such a way as to connect lower end portions of the front longitudinal side portion 19 and the rear longitudinal side portion 20 to each other.

Note that the panel outer member 10 of this embodiment is assumed to be formed from a frame portion (a frame) made of a steel plate, which is obtained by integrating the front longitudinal side portion 19, the rear longitudinal side portion 20, and the lower side portion 21 together in accordance with a hot press forming method.

As shown in FIG. 1, the front longitudinal side portion 19 includes a projecting wall 26 that projects outward in the vehicle width direction (the left side of FIG. 1). Meanwhile, the rear longitudinal side portion 20 includes a projecting wall 27 that projects outward in the vehicle width direction (the left side of FIG. 1). These projecting walls 26 and 27 include wall surfaces 26a and 27a, which are opposed to each other in the front-rear direction. These wall surfaces 26a and 27a serve as attaching surfaces for two end portions of each of reinforcement members 25a and 25b (see FIG. 2) to be described later.

As shown in FIG. 2, the panel outer member 10 includes a first connecting member 23a and a second connecting member 23b.

The first connecting member 23a connects upper end portions of the front longitudinal side portion 19 and the rear longitudinal side portion 20 to each other by welding. The second connecting member 23b connects intermediate portions of the front longitudinal side portion 19 and the rear longitudinal side portion 20 to each other by welding.

Each of these connecting members 23a and 23b corresponds to a "connecting member" as defined in the appended claims, which connects the front longitudinal side portion 19 to the rear longitudinal side portion 20 in the front-rear direction. In the following description, these connecting members 23a and 23b may be simply referred to as the connecting members 23 when it is not necessary to distinguish these members.

Figure 3:
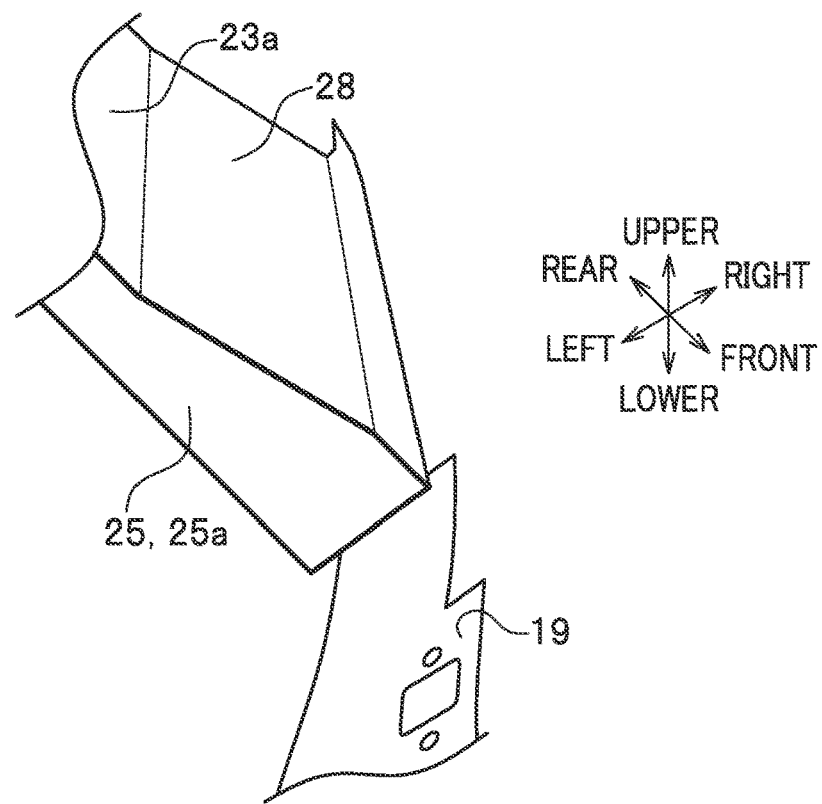
FIG. 3 is a partially enlarged perspective view illustrating an aspect of looking up a corner portion from a lower part on an inner side in a vehicle width direction, the corner portion being formed between a connecting member and a front longitudinal side portion constituting the door structure.

FIG. 3 is a partially enlarged perspective view of FIG. 2. This FIG. 3 is a partially enlarged perspective view illustrating an aspect of looking up a corner portion from a lower part on the right side (a lower part on an inner side in the vehicle width direction), which is formed between the connecting member 23a and the front longitudinal side portion 19.

As shown in FIG. 3, a front end portion of the first connecting member 23a has an inclined surface 28 on the inner side in the vehicle width direction (the right side of FIG. 3).

This inclined surface 28 in inclined in such a way as to gradually draw away from the outer panel 8 (see FIG. 2) side as the inclined surface 28 transitions away from a center side of the first connecting member 23a toward the front longitudinal side portion 19 side. Thus, a closed cross-section formed from the first connecting member 23a and a first reinforcement member 25a to be described later grows larger toward the front longitudinal side portion 19 side.

Meanwhile, although illustration is omitted, another inclined surface that gradually increases the closed cross-section toward the rear longitudinal side portion 20 is also formed on the rear longitudinal side portion 20 side of the first connecting member 23a. Moreover, although illustration is omitted, two end portions of the second connecting member 23b are also provided with inclined surfaces that increase a closed cross-section formed in conjunction with a second reinforcement member 25b to be described later (see FIG. 2) as each of the inclined surfaces approaches the front longitudinal side portion 19 or the rear longitudinal side portion 20.

Figure 4:
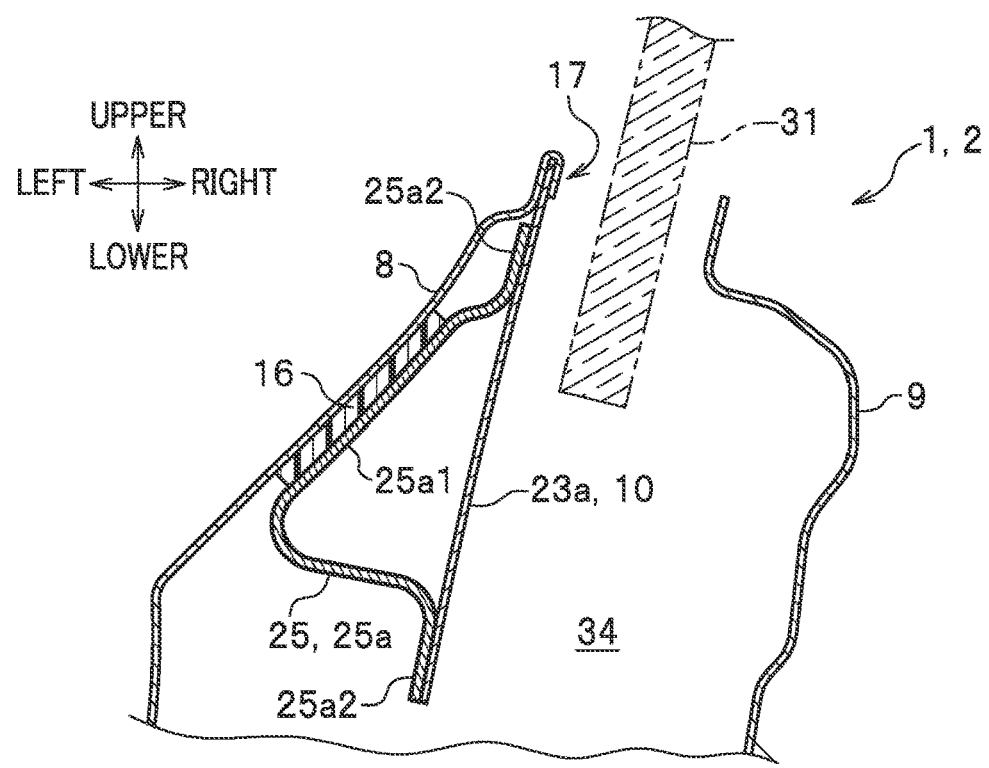
FIG. 4 is a cross-sectional view taken along the IV-IV line in FIG. 1.

FIG. 4 is a cross-sectional view taken along the IV-IV line in FIG. 1. In FIG. 4, reference sign 31 denotes window glass indicated with phantom lines.

As shown in FIG. 4, an upper edge of the first connecting member 23a constituting the panel outer member 10 forms a lower edge of a not-illustrated window opening in conjunction with an upper edge of the panel inner member 9 arranged at a given space away from the panel outer member 10. The window glass 31 which is longitudinally slidably installed can be housed in a door hollow portion 34 through the space between the upper edge of the first connecting member 23a and the upper edge of the panel inner member 9.

The above-described upper edge of the first connecting member 23a is joined (joined by hemming) to the outer panel 8 in accordance with hemming work by folding the upper edge of the outer panel 8.

As shown in FIG. 2, the second connecting member 23b extends in the front-rear direction in parallel with the first connecting member 23a.

The second connecting member 23b of this embodiment is located closer to the lower side portion 21 relative to the center of a longitudinal breadth of the panel outer member 10.

Specifically, as shown in FIG. 2, the second connecting member 23b is arranged such that a front end portion of the second connecting member 23b is joined to a hinge attachment portion 18 provided to the front longitudinal side portion 19.

The above-described panel outer member 10 (see FIG. 2) and the panel inner member 9 (see FIG. 2) are joined to each other at appropriate positions by spot welding and the like, thus collectively forming the inner panel 7 (see FIG. 2).

Next, the reinforcement members 25 (see FIG. 2) will be described.

As shown in FIG. 2, the reinforcement members 25 include the first reinforcement member 25a that corresponds to the first connecting member 23a, and the second reinforcement member 25b that corresponds to the second connecting member 23b.

In the following description, these reinforcement members 25a and 25b may be simply referred to as the reinforcement members 25 when it is not necessary to distinguish these members.

As shown in FIG. 1, these reinforcement members 25a and 25b are elongate members, which are provided separately from the connecting members 23a and 23b and extend in the front-rear direction along the connecting members 23a and 23b, respectively.

As shown in FIG. 2, these reinforcement members 25a and 25b are joined to the connecting members 23a and 23b, respectively, from an outer side in the vehicle width direction (the left side of FIG. 2).

As shown in FIG. 4 which is a cross-sectional view taken along the IV-IV line in FIG. 1, the first reinforcement member 25a is formed from a bent plate body. The first reinforcement member 25a takes on a hat shape in cross-sectional view intersecting with a longitudinal direction shown in FIG. 4. The first reinforcement member 25a includes a body part 25a1 corresponding to a top part of the hat shape and flange parts 25a2 corresponding to brim parts of the hat shape.

As shown in FIG. 4, the body part 25a1 of the first reinforcement member 25a takes on a substantially triangular shape having an inclined side aligned with an inner surface of the outer panel 8 serving as the door skin. Note that a space between the inclined side of the body part 25a1 and the outer panel 8 in FIG. 4 is drawn in an exaggerated manner for the convenience of illustration. In reality, the inclined side of the body part 25a1 and the outer panel 8 are brought close to each other by using a mastic sealer 16 (an adhesive material).

The pair of flange parts 25a2 of the first reinforcement member 25a are formed in along an outer side surface in the vehicle width direction (a left side surface in FIG. 4) of the first connecting member 23a. The pair of flange parts 25a2 are joined to the first connecting member 23a by spot welding and the like.

Specifically, the first reinforcement member 25a is attached to a portion below a hem-joined portion 17 of the first connecting member 23a.

In this way, the first reinforcement member 25a forms the substantially triangular closed cross-section in conjunction with the first connecting member 23a.

As shown in FIG. 1, the two end portions of the first reinforcement member 25a are arranged to face the wall surfaces 26a and 27a of the projecting walls 26 and 27, respectively.

As described above, the two end portions of the first reinforcement member 25a are joined to the wall surfaces 26a and 27a of the projecting walls 26 and 27, respectively. To be more precise, flange portions 25a3 formed at the two end portions of the first reinforcement member 25a, respectively, are joined to the wall surfaces 26a and 27a by spot welding. Note that FIG. 1 depicts only the flange portion 25a3 on the front side of the first reinforcement member 25a for the convenience of illustration while omitting the flange portion 25a3 on the rear side.

Meanwhile, although illustration is omitted, the second reinforcement member 25b shown in FIG. 1 also takes on a hat shape in cross-sectional view intersecting with the longitudinal direction. As with the first reinforcement member 25a, the second reinforcement member 25b is joined to the second connecting member 23b shown in FIG. 1, thus forming a closed cross-section in a space with the second connecting member 23b. Two end portions of the second reinforcement member 25b are joined to the wall surfaces 26a and 27a of the projecting walls 26 and 27 by using flange portions 25b3, respectively.

<Operation and Effect>

Next, the operation and effect of the door structure 1 of this embodiment will be described.

The panel outer member 10 of the door structure 1 of this embodiment is formed from the frame including the front longitudinal side portion 19, the rear longitudinal side portion 20, the lower side portion 21, and the connecting members 23.

Unlike the conventional door structure in the form of a panel (see Patent Literature 1, for example), the panel outer member 10 of the door structure 1 of this embodiment is formed from the frame. According to the door structure 1, the side door 2 is lighter in weight than that in the conventional structure.

Moreover, the door structure 1 of this embodiment includes the reinforcement members 25 each forming the closed cross-section in the space with the corresponding connecting member 23.

According to the above-described door structure 1, it is possible to improve strength of the side door 2 as a whole.

Meanwhile, in this door structure 1, each reinforcement member 25 is joined to the corresponding connecting member 23 from the outer side in the vehicle width direction. Moreover, the two end portions of each reinforcement member 25 are arranged to face the projecting walls 26 and 27.

This door structure 1 can form the closed cross-section across the connecting member 23 in the longitudinal direction by using the reinforcement member 25. The above-described door structure 1 effectively suppresses a folding deformation of the connecting member 23 due to an input load in case of a collision.

In the meantime, in this door structure 1, an inner side surface in the vehicle width direction at an end portion of the connecting member 23 is inclined in such a way as to gradually draw away from the outer panel 8 side as the inner side surface transitions away from the center side of the connecting member 23.

According to the above-described door structure 1, it is possible to ensure a large area of the closed cross-section which is formed from the connecting member 23 and the reinforcement member 25 that linearly extends on the outer side in the vehicle width direction of the connecting member 23. Thus, rigidity is enhanced at the end portion of the connecting member 23.

The above-described door structure 1 can prevent the side door 2 from breaking into the vehicle interior in case of a collision.

Moreover, according to the above-described door structure 1, the shape on the outer panel 8 side of the connecting member 23 need not be changed. Hence, external appearance of the outer panel 8 is not affected.

Furthermore, the above-described door structure 1 just provides the connecting member 23 with the inclined surfaces, and this reinforcement structure does not constitute a hindrance to formation of the outer panel 8 by press forming.

In addition, the outer panel 8 having the above-described simple reinforcement structure by use of the inclined surfaces can be obtained not only by the ordinary press forming but also in accordance with a hot press forming method.

Meanwhile, the end portion of the connecting member 23b of this door structure 1 is joined to the hinge attachment portion 18 provided to the front longitudinal side portion 19.

According to the above-described door structure 1, an input load from forward generates a stress on the hinge attachment portion 18 in case of a front collision of the vehicle. However, the door structure 1 suppresses concentration of the stress on the hinge attachment portion 18 by allowing the connecting member 23b to transmit and disperse the inputted load rearward.

In the meantime, in the door structure 1, the connecting member 23a is joined by hemming to the outer panel 8 without having to interpose the reinforcement member 25a between the outer panel 8 and the connecting member 23a. The reinforcement member 25a is attached to the portion below this hem-joined portion 17.

According to the above-described door structure 1, it is possible to reduce a thickness of a junction between the connecting member 23a and the outer panel 8 by using the hem-joined portion 17. Moreover, the door structure 1 uses this hem-joined portion 17 to prevent rainwater, car wash water, and the like from getting in through a gap between the connecting member 23a and the outer panel 8. The door structure 1 avoids adherence of water to a joint surface between the reinforcement member 25a and the connecting member 23a.

Meanwhile, of the panel outer member 10 and the panel inner member 9 in this door structure 1, at least the panel outer member 10 is a hot press formed member.

According to the door structure 1, the panel outer member 10 has higher strength as compared to a panel outer member 10 obtained in accordance with the ordinary press forming method. Note that the panel inner member 9 of this embodiment is assumed to be the ordinary press formed member. However, the panel inner member 9 may be a hot press formed member instead.

In the meantime, in this door structure 1, the reinforcement member 25 is fixed to the outer panel 8 by using the mastic sealer (the adhesive material).

The above-described door structure 1 can suppress deformation of the outer panel 8 in case of a collision more effectively as compared to the case of not providing the mastic sealer 16 (the adhesive material).

While the embodiment of the present invention has been described above, the present invention is not limited only to this embodiment and can be embodied in various other modes.

Figure 5A:
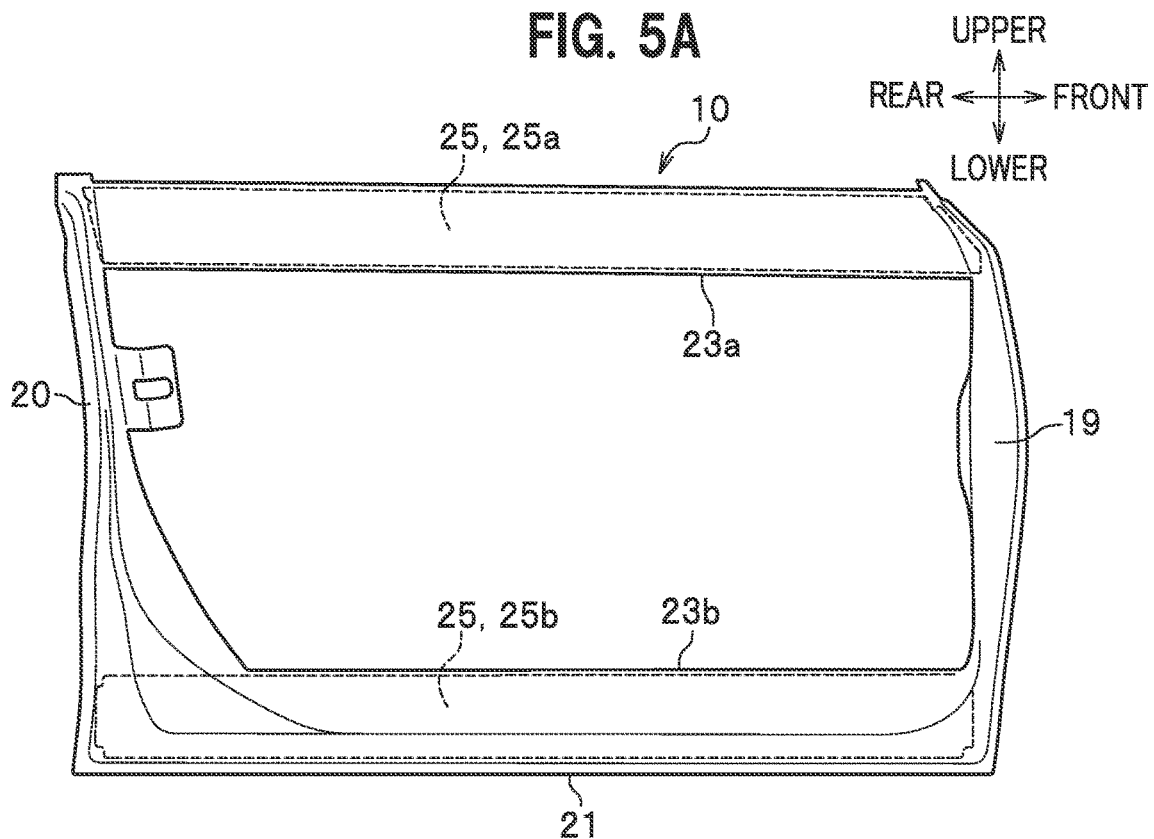
FIG. 5A is a right side view of a panel outer member in a door structure according to a modified example.
Figure 5B:
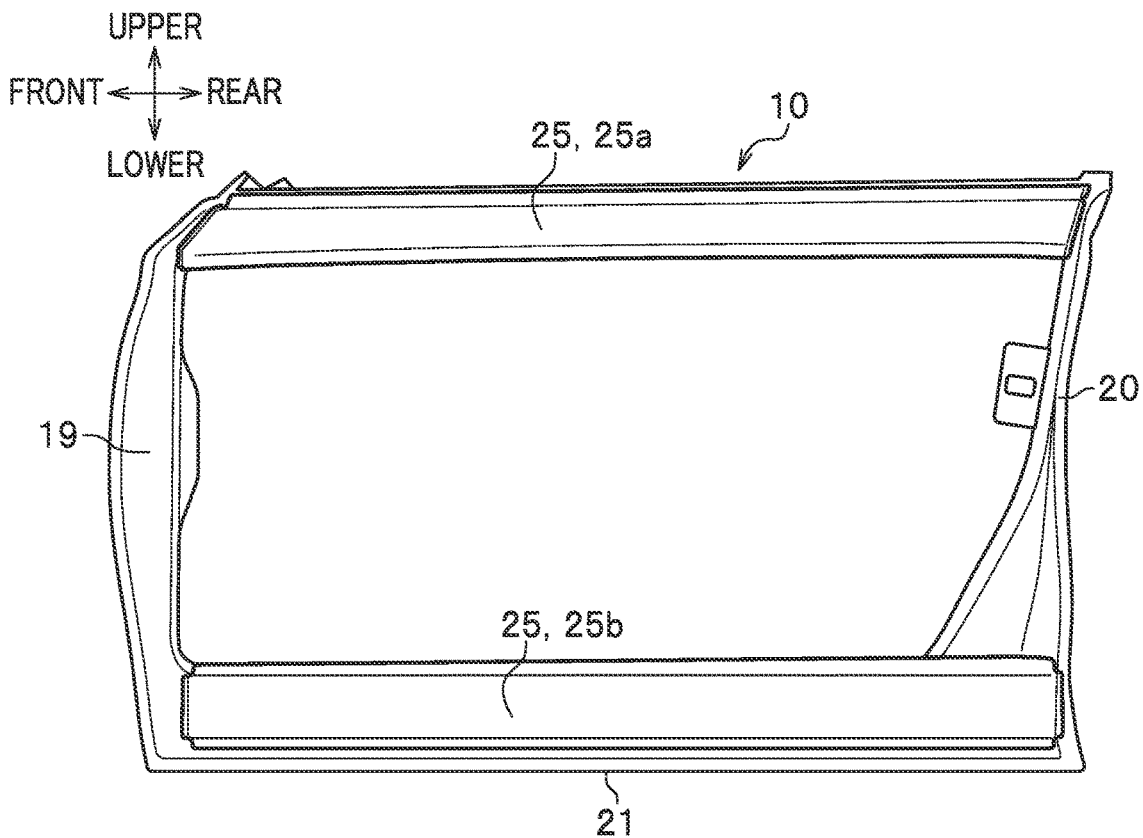
FIG. 5B is a left side view of the panel outer member in the door structure according to the modified example.

FIG. 5A is a right side view of a panel outer member 10 in a door structure 1 according to a modified example. FIG. 5B is a left side view of the panel outer member 10 in the door structure 1 according to the modified example.

In the embodiment, as described above, the second connecting member 23b and the second reinforcement member 25b are connected to the panel outer member 10 at a height corresponding to the hinge attachment portion 18 (see FIG. 1 and FIG. 2).

In contrast, in the modified example, the second connecting member 23b and the second reinforcement member 25b are arranged on the panel outer member 10 such that portions of the second connecting member 23b and the second reinforcement member overlap the lower side portion 21 of the panel outer member 10 (see FIG. 5A and FIG. 5B).

The embodiment has described the door structure 1 that includes the hinge attachment portion 18 provided to the front longitudinal side portion 19 of the panel outer member 10.

However, the present invention is also applicable to a vehicle provided with a hinge on the rear side of the side door 2. Although illustration is omitted, the end portion of the connecting member 23b in this door structure 1 is joined to a hinge attachment portion provided to the rear longitudinal side portion 20.

What is claimed is:
1. A door structure comprising:
an outer panel; and
an inner panel, wherein
the inner panel is formed from a panel inner member located on an inner side of a vehicle interior and a panel outer member located on an outer side of the vehicle interior, and
the panel outer member includes
a front longitudinal side portion extending in an upper-lower direction at a front end portion of the panel outer member,
a rear longitudinal side portion extending in the upper-lower direction at a rear end portion of the panel outer member,
a lower side portion configured to join a lower end portion of the front longitudinal side portion to a lower end portion of the rear longitudinal side portion,
a connecting member configured to connect the front longitudinal side portion to the rear longitudinal side portion in a front-rear direction, and
a reinforcement member provided separately from the connecting member and joined to the connecting member in such a way as to extend in the front-rear direction along the connecting member and to form a closed cross-section in a space with the connecting member,
the front longitudinal side portion includes a projecting wall projecting outward in a vehicle width direction,
the reinforcement member is joined to the connecting member from an outer side in the vehicle width direction, and
an end portion of the reinforcement member is arranged to face the projecting wall.
2. The door structure according to claim 1, wherein an inner side surface in the vehicle width direction at an end portion of the connecting member is inclined in such a way as to gradually draw away from the outer panel side as the inner side surface transitions away from a center side of the connecting member.
3. The door structure according to claim 2, wherein the end portion of the connecting member is joined to a hinge attachment portion provided to any of the front longitudinal side portion and the rear longitudinal side portion.
4. The door structure according to claim 1, wherein of the panel outer member and the panel inner member, at least the panel outer member is a hot press formed member.
5. The door structure according to claim 1, wherein the reinforcement member is fixed to the outer panel by using an adhesive material.

* * * * *